United States Patent
Farre Guiu et al.

(10) Patent No.: US 10,248,864 B2
(45) Date of Patent: Apr. 2, 2019

(54) SYSTEMS AND METHODS FOR CONTEXTUAL VIDEO SHOT AGGREGATION

(71) Applicant: Disney Enterprises, Inc., Burbank, CA (US)

(72) Inventors: Miquel Angel Farre Guiu, Bern (CH); Pablo Beltran Sanchidrian, Barcelona (ES); Aljoscha Smolic, Aarau (CH)

(73) Assignee: Disney Enterprises, Inc., Burbank, CA (US)

( * ) Notice: Subject to any disclaimer, the term of this patent is extended or adjusted under 35 U.S.C. 154(b) by 122 days.

(21) Appl. No.: 14/958,637

(22) Filed: Dec. 3, 2015

(65) Prior Publication Data

US 2017/0076153 A1 Mar. 16, 2017

Related U.S. Application Data

(60) Provisional application No. 62/218,346, filed on Sep. 14, 2015.

(51) Int. Cl.
*G06K 9/00* (2006.01)
*H04N 21/8549* (2011.01)
(Continued)

(52) U.S. Cl.
CPC ..... *G06K 9/00718* (2013.01); *G06K 9/00295* (2013.01); *G06K 9/4652* (2013.01);
(Continued)

(58) Field of Classification Search
CPC .......... G06K 9/00718; G06K 9/00295; G06K 9/4652; G06K 9/6224; G11B 27/34; H04N 21/8456; H04N 21/8549
See application file for complete search history.

(56) References Cited

U.S. PATENT DOCUMENTS 5,821,945 A 10/1998 Yeo
6,278,446 B1 8/2001 Liou
(Continued)

FOREIGN PATENT DOCUMENTS

WO WO 2005/093752 A1 10/2005

OTHER PUBLICATIONS

"Unsupervised Video-Shot Segmentation and Model-Free Anchor-person Detection for News Video Story Parsing" by: Xinbo Gao et al., Sep. 2002, pp. 1-12.

*Primary Examiner* — Mishawn N Hunter
(74) *Attorney, Agent, or Firm* — Farjami & Farjami LLP

(57) ABSTRACT

There is provided a method that includes receiving a video having video shots, and creating video shot groups based on similarities between the video shots, where each video shot group of the video shot groups includes one or more of the video shots and has different ones of the video shots than other video shot groups. The method further includes creating at least one video supergroup including at least one video shot group of the video shot groups based on interactions among the one or more of the video shots in each of the video shot groups, and divide the at least one video supergroup into connected video supergroups, each connected video supergroup of the connected video supergroups including one or more of the video shot groups based on the interactions among the one or more of video shots in each of the video shot groups.

24 Claims, 5 Drawing Sheets

(51) Int. Cl.
  *H04N 21/845* (2011.01)
  *G11B 27/34* (2006.01)
  *G06K 9/46* (2006.01)
  *G06K 9/62* (2006.01)

(52) U.S. Cl.
  CPC ............ *G06K 9/6224* (2013.01); *G11B 27/34* (2013.01); *H04N 21/8456* (2013.01); *H04N 21/8549* (2013.01)

(56) References Cited

U.S. PATENT DOCUMENTS

| | | | |
|---|---|---|---|
| 6,535,639 B1 | 3/2003 | Uchihachi | |
| 6,580,437 B1 | 6/2003 | Liou | |
| 6,735,253 B1 * | 5/2004 | Chang | G11B 27/28 |
| | | | 375/240.16 |
| 7,949,050 B2 | 5/2011 | Xu | |
| 8,117,204 B2 | 2/2012 | Girgensohn | |
| 8,200,063 B2 | 6/2012 | Chen | |
| 9,684,644 B2 * | 6/2017 | Badoiu | G06F 17/3082 |
| 2002/0146168 A1 | 10/2002 | Lee | |
| 2003/0131362 A1 | 7/2003 | Jasinschi | |
| 2004/0130567 A1 | 7/2004 | Ekin | |
| 2007/0067724 A1 * | 3/2007 | Takahashi | G11B 27/031 |
| | | | 715/723 |
| 2007/0124282 A1 * | 5/2007 | Wittkotter | G06F 17/30858 |
| 2007/0201558 A1 * | 8/2007 | Xu | G06K 9/6218 |
| | | | 375/240.22 |
| 2008/0127270 A1 * | 5/2008 | Shipman | G06F 17/30843 |
| | | | 725/46 |
| 2008/0316307 A1 * | 12/2008 | Petersohn | G06K 9/00765 |
| | | | 348/135 |
| 2009/0100454 A1 | 4/2009 | Weber | |
| 2009/0123025 A1 * | 5/2009 | Deng | G06K 9/00711 |
| | | | 382/100 |
| 2009/0208106 A1 * | 8/2009 | Dunlop | G06K 9/00664 |
| | | | 382/173 |
| 2011/0069939 A1 * | 3/2011 | Choi | G06K 9/00751 |
| | | | 386/278 |
| 2011/0122137 A1 * | 5/2011 | Wang | G06T 11/206 |
| | | | 345/440 |
| 2013/0300939 A1 | 11/2013 | Chou | |
| 2013/0330055 A1 | 12/2013 | Zimmermann | |
| 2014/0025386 A1 | 1/2014 | Xiang | |
| 2015/0317511 A1 * | 11/2015 | Li | G06K 9/00288 |
| | | | 382/118 |
| 2016/0029106 A1 * | 1/2016 | Chen | G06F 17/30837 |
| | | | 386/282 |
| 2017/0011264 A1 * | 1/2017 | Smolic | G06K 9/00711 |

* cited by examiner

SYSTEMS AND METHODS FOR CONTEXTUAL VIDEO SHOT AGGREGATION

RELATED APPLICATION(S)

The present application claims the benefit of and priority to a U.S. Provisional Patent Application Ser. No. 62/218,346, filed Sep. 14, 2015, and titled "Contextual Video Shot Aggregation," which is hereby incorporated by reference in its entirety into the present application.

BACKGROUND

Typical videos, such as television (TV) shows, include a number of different video shots shown in a sequence, the content of which may be processed using video content analysis. Conventional video content analysis may be used to identify motion in a video, recognize objects and/or shapes in a video, and sometimes to track an object or person in a video. However, conventional video content analysis merely provides information about objects or individuals in the video. Identifying different parts of a show requires manual annotation of the show, which is a costly and time-consuming process.

SUMMARY

The present disclosure is directed to systems and methods for contextual video shot aggregation, substantially as shown in and/or described in connection with at least one of the figures, as set forth more completely in the claims.

DETAILED DESCRIPTION

Figure 1:
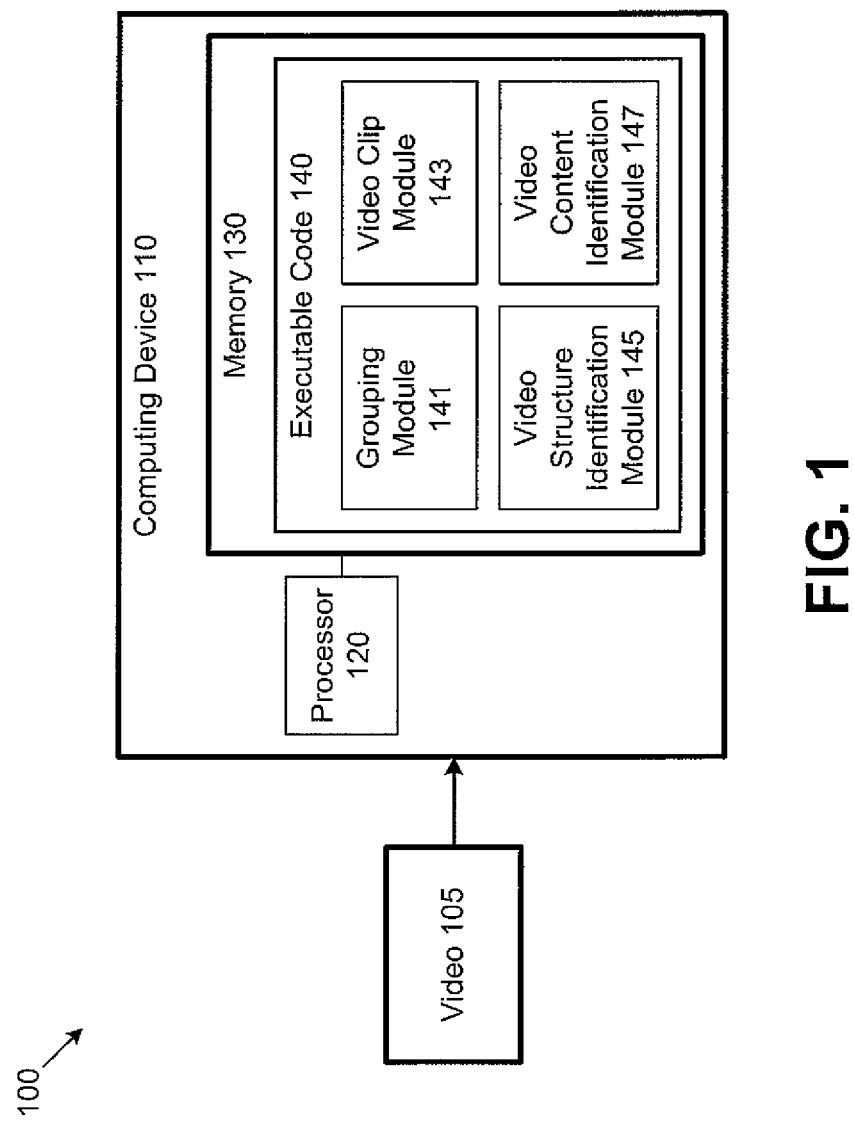
FIG. 1 shows a diagram of an exemplary system for contextual video shot aggregation, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for contextual video shot aggregation, according to one implementation of the present disclosure. System 100 includes video 105 and computing device 110, which includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140.

Video 105 is a video having a plurality of video shots. In some implementations, a video shot may include a frame of video 105 or a plurality of frames of video 105, such as consecutive frames. Video 105 may be a live video broadcast, such as a nightly news broadcast, or a video that is recorded for delayed broadcast, such as a TV sitcom, a TV drama, a TV comedy, a TV contest, or other TV program such as a game show or talent competition.

Grouping module 141 is an executable code module for creating video shot groups, including video shots of video 105, and video supergroups, including a number of video shot groups in video 105. Grouping module 141 may classify video shots of video 105 as video shot groups based on similarities in the video shots. In some implementations, grouping module 141 may include a grouping algorithm, e.g., DBSCAN, which stands for density-based spatial clustering of applications with noise. Using a grouping algorithm may allow grouping module 141 to find related video shots of video 105 based on grouping parameters such as the minimum number of video shots necessary to be considered a video shot group, the maximum reachable distance between the video shots of video 105, etc. The maximum reachable distance may be related to the content of the video shots and can be, for example, a color distance, a distance between the similarity of the people in the video shots, and/or other computer vision features such as scale-invariant feature transform (SIFT) or speeded up robust features (SURF). Grouping module 141 may consider a different number of video shot groups in different scenarios.

Grouping module 141 may be configured to create one or more video shot groups based on the video shots in video 105. In some implementations, a video shot group may be created based on features of the video shots and/or other information associated with the video shots. A video shot group may include one or more video shots of video 105 that share similar features. For example, video shots that share similar features may include video shots portraying the same persons, actions, environments, e.g., based on detection of substantially the same objects or other low level features (such as main colors, SIFT, SURF, between others) in two or more video shots, such as a building and/or other objects, and/or other similar features. Additionally, grouping module 141 may be configured to create video supergroups based on relationships between the video shots in the plurality of video shot groups. In some implementations, grouping module 141 may create video supergroups based on the temporal relationship between video shot groups in the plurality of video groups, or other interactions between video shot groups in the plurality of video shot groups.

In some implementations, grouping module 141 may be configured such that determining one or more video shot groups may include determining a similarity of features between two or more video shots, assigning similar video shots to a common video shot group, and/or assigning dissimilar video shots to separate video shot groups. Similarity may be determined until one or more of the video shots of video 105 may be either assigned to a video shot group including one or more other video shots and/or assigned to its own video shot group, e.g., due to being dissimilar from the other video shots of video 105. Also, similarity between video shots may be determined based on comparing features of sample frames selected from individual video shots and/or other techniques for determining video shot similarity. For example, grouping module 141 may be configured such that determining similarity between video shots includes one or more of selecting one or more sample frames from individual video shots, comparing features of selected one or more sample frames between the selected video shots, and determining, based on the comparison, whether the video shots are similar. In some implementations, grouping module 141 may be configured such that the video shots are assigned to a given video shot group based on a comparison of features of respective one or more sample frames of the video shots. Grouping module 141 may be configured such that, based on a comparison of features of respective one or more sample frames of the video shots, individual video shots that are not similar are assigned to separate video shot groups.

Further, grouping module 141 may be configured such that determining video supergroups may be based on compiling an undirected graph and/or by other techniques. An undirected graph may be compiled such that a given vertex may represent a video shot group and/or an edge may be weighted based on a determined temporal connection level (the more connected two groups are temporally, the higher the weight of the edge is). The weights may be viewed as the probability of going from one vertex to another. Grouping module 141 may be configured to group one or more vertices in the graph using an unsupervised cluster algorithm for graphs based on simulation of flow, such as a Markov Cluster Algorithm, affinity propagation, DBSCAN, and/or other clustering technique used to determine groups. By varying one or more grouping parameters, and/or by using a cutoff threshold, grouping module 141 may be configured to control a granularity of the clustering for determining video groups.

Video clip module 143 is an executable code or software module for creating video clips of video 105. In some implementations, video clip module 143 may identify a plurality of temporally adjacent video shots within the same video supergroup. A video supergroup containing only temporally adjacent video shots may be classified as a video clip. Video clip module 143 may provide the start time of the video clip in video 105 and the end time of the video clip in video 105, and may provide a beginning timestamp and an ending timestamp of the video clip. After the grouping of shot groups into video supergroups, video clip module 143 may obtain video supergroups that contain video groups including video shots that are temporally adjacent in video 105, and some of the video supergroups may contain video shots that are not temporally adjacent in video 105. In some implementations, video clip module 143 may provide a start time and an end time for each video shot group of the plurality of video shot groups in video 105, and a start time and an end time for each video supergroup of the plurality of video supergroups in video 105.

Structure identification module 145 is an executable code or software module for identifying a structure of video 105. The structure of video 105 may identify interactions among a plurality of video shots in video 105 based on the video shot groups and video supergroups they belong to. Structure identification module 145 may identify a pattern of video shots within video 105, including a repeated return to a video supergroup such as an anchor group, a repeated scene or setting such as the stage of a TV competition, the various sets of a TV program, etc.

Content identification module 147 is an executable code or software module for identifying a content of video 105. In some implementations, content identification module 147 may extract multiple features from video 105 and may combine them statistically to generate models for various types of programs. The models may allow content identification module 147 to make a rough categorization of video 105. For example, without watching the video content identification module 147 may say that video 105 contains a News video, a TV Show, a Talent Show a TV contest, etc. The features that are extracted may include information related to the structure of video 105 obtained from structure identification module 145, e.g. number of clips (adjacent video shots) in video 105, the distribution of video shots (two groups of shots or multiple groups interacting) in video 105, the number of different types of video shots that are aggregated per video group in video 105, etc.

Figure 2:
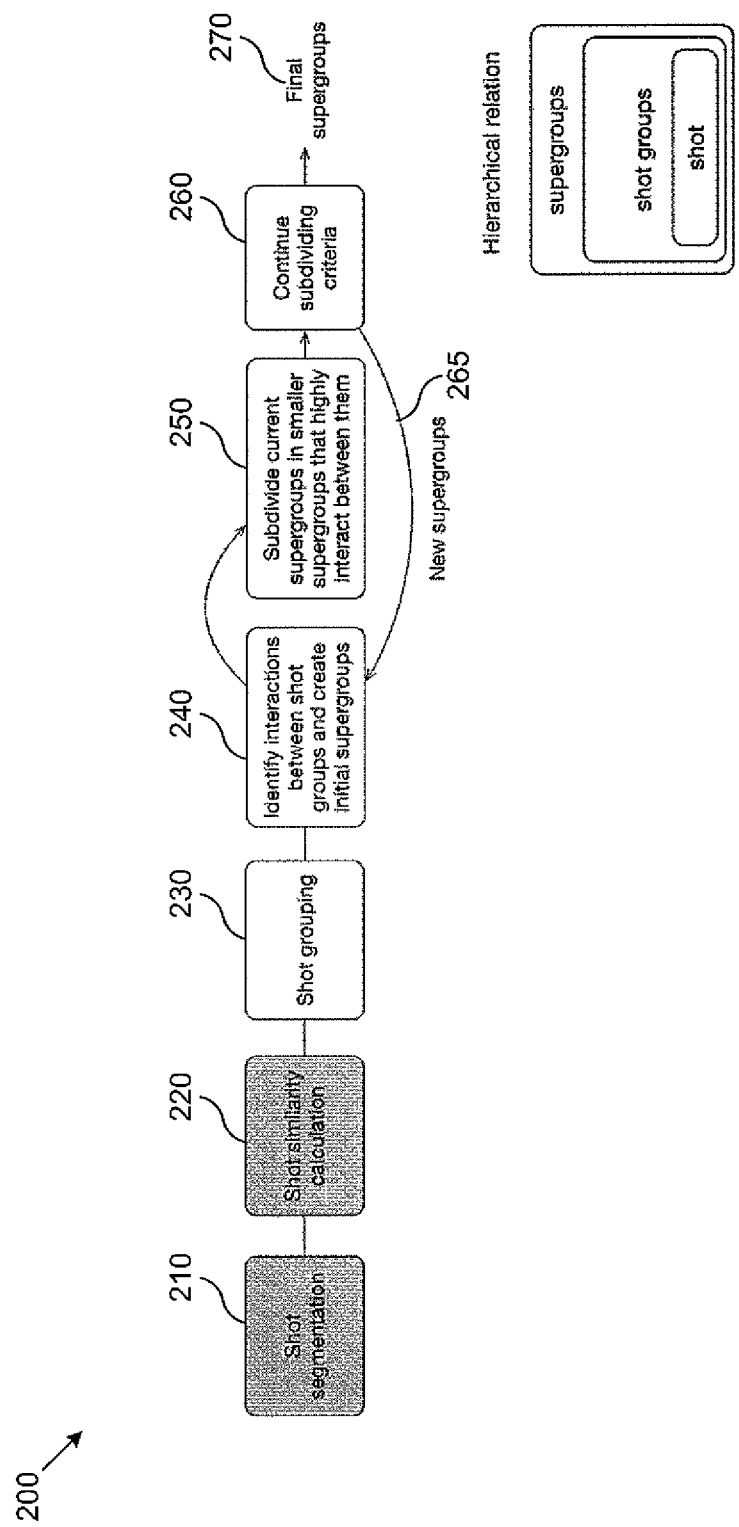
FIG. 2 shows a diagram of an exemplary process for contextual video shot aggregation based on intelligent video shot grouping, according to one implementation of the present disclosure.

FIG. 2 shows a diagram of an exemplary process for contextual video shot aggregation based on intelligent video shot grouping, according to one implementation of the present disclosure. Process 200 begins with shot segmentation 210 and shot similarity calculation 220, which are further detailed in U.S. patent application Ser. No. 14/793,584, filed Jul. 7, 2015, titled "Systems and Methods for Automatic Key Frame Extraction and Storyboard Interface Generation for Video," which is hereby incorporated by reference in its entirety.

After shot segmentation 210 and shot similarity calculation 220, process continues at 230, by video shot grouping using grouping module 141, which groups video shots of video 105 into a plurality of video shot groups, as described in conjunction with FIG. 1. Grouping module 141 may identify video shots in video 105 based on the persons included in, location and/or setting shown in, and/or other low level features based on shapes and colors shown in the frames of video 105. Process 200 continues at 240, where grouping module 141 creates a graph of video 105, identifying interactions between the plurality of video shot groups in video 105. With this identification, an initial set of video supergroups is created including one or more video supergroups that may be refined iteratively. In some implementations, interactions between video shot groups may include similarities, such as video shots showing the same persons or places, and/or temporal relationships between the video shots in video 105, and identifying interactions may include identifying temporally adjacent video shots in the plurality of video shot groups. Grouping module 141 may gather similar video shots together in video shot clusters. Grouping module 141 may use temporal relationships between video shots in video 105 to create the graph, with the video shot clusters as nodes and temporal transitions as edges, i.e., a pair of nodes has an edge between them if one node includes a video shot that is adjacent in time with one video shot from the other node.

At 250, grouping module 141 subdivides the current video supergroups into smaller video supergroups that contain video shot groups that highly interact with one another. The smaller video supergroups may be connected video supergroups based on the interactions of the video shots within the video shot groups forming the connected video supergroups. Video shot groups may highly interact with one another based on how they temporally relate to one another in video 105. After graph creation, grouping module 141 may search for closely related video shot groups by looking at the number of edges between them using a Highly Connected Subgraph (HCS) algorithm. The HCS algorithm may be used to find the more connected vertices of the graph by recursively applying the mincut to a connected graph or subgraph until the minimum cut value, i.e. the number of edges of the mincut in an undirected graph, is greater than the half the number of nodes. To minimize the number of clusters, grouping module 141 may use an edge contraction algorithm, e.g., Karger's algorithm, to find the minimum cut that splits the graph in disjoint sets of the similar number of vertices or nodes. In some implementations, grouping module 141 may perform HCS clustering iterations contracting the edges of which both vertices are within the same cluster.

At 260 of process 200, grouping module 141 continues the subdividing criteria. If 250 managed to make a new subdivision the algorithm returns to 240, as indicated by smaller video supergroups 265. Once is not possible to continue subdividing the video supergroups according to the rules in 250, process 200 proceeds to 270 with the final video groups and video supergroups.

Figure 3:
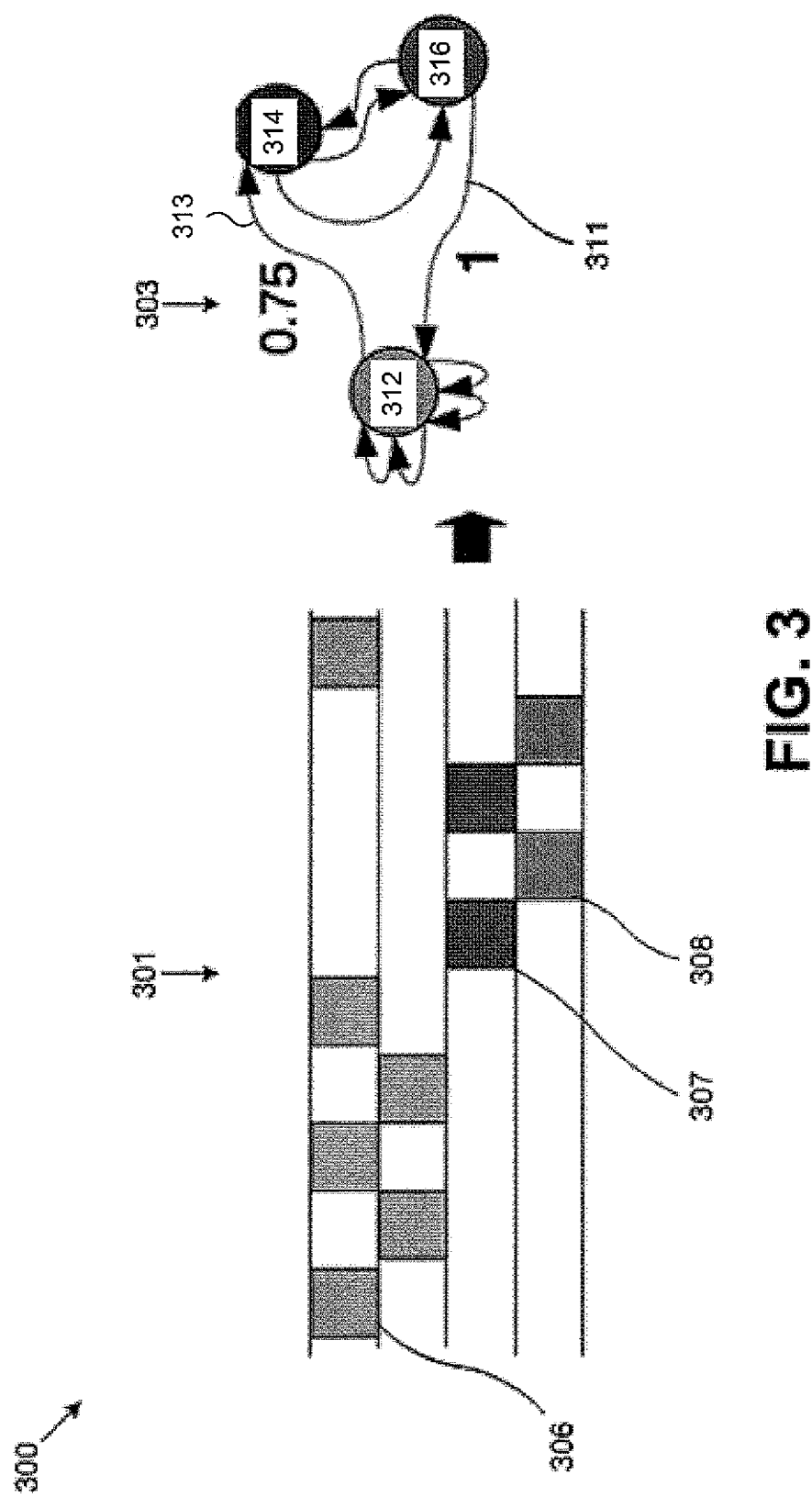
FIG. 3 shows a diagram of an exemplary graph creation using video shots from the video, according to one implementation of the present disclosure.

FIG. 3 shows a diagram of an exemplary graph creation using video shots from video 105, according to one implementation of the present disclosure. Diagram 300 shows video shots of video 105 displayed in a two-dimensional (2D) format in storyboard 301, including a video shot 306, video shot 307, and video shot 308, each video shot including a plurality of video frames. After graph creation, grouping module 141 may search for closely related video shot groups based on the number of edges between the video shot groups using the HCS algorithm in 250 step of FIG. 2. The HCS algorithm's aim is to find the more connected vertices or graph 303. In order to do so, the algorithm applies recursively the minimum cut to a connected graph or subgraphs until the minimum cut value, i.e. the number of edges of the mincut in an undirected graph, is greater than the half the number of nodes. As the grouping module 141 desires to minimize the number of clusters, grouping module 141 uses the Karger's scheme to find the minimum cut that splits the graph in disjoint sets of the similar number of vertices.

In some implementations, an edge may be assigned a weight with some edges having a higher weight and some edges having a lower weight. The weight assigned to each edge connecting the plurality of shot groups in a video supergroup, where each shot group forms a node in the graph of the video supergroup. In some implementations, an edge leaving a highly connected shot group may have a lower weight than an edge leaving a shot group that is not highly connected. For example, edge 313 leaves shot group 312 and connects to shot group 314. Because shot group 312 is highly connected, as shown by the number of edges connecting shot group 312 to itself, edge 313 is assigned a weight of 0.75. Edge 311, leaving shot group 316 and connecting to shot group 312, is assigned a weight of 1, because shot group 316 is not highly connected. By assigning weights in this manner, small and independent shot groups may not be absorbed by larger highly connected shot groups.

Figure 4:
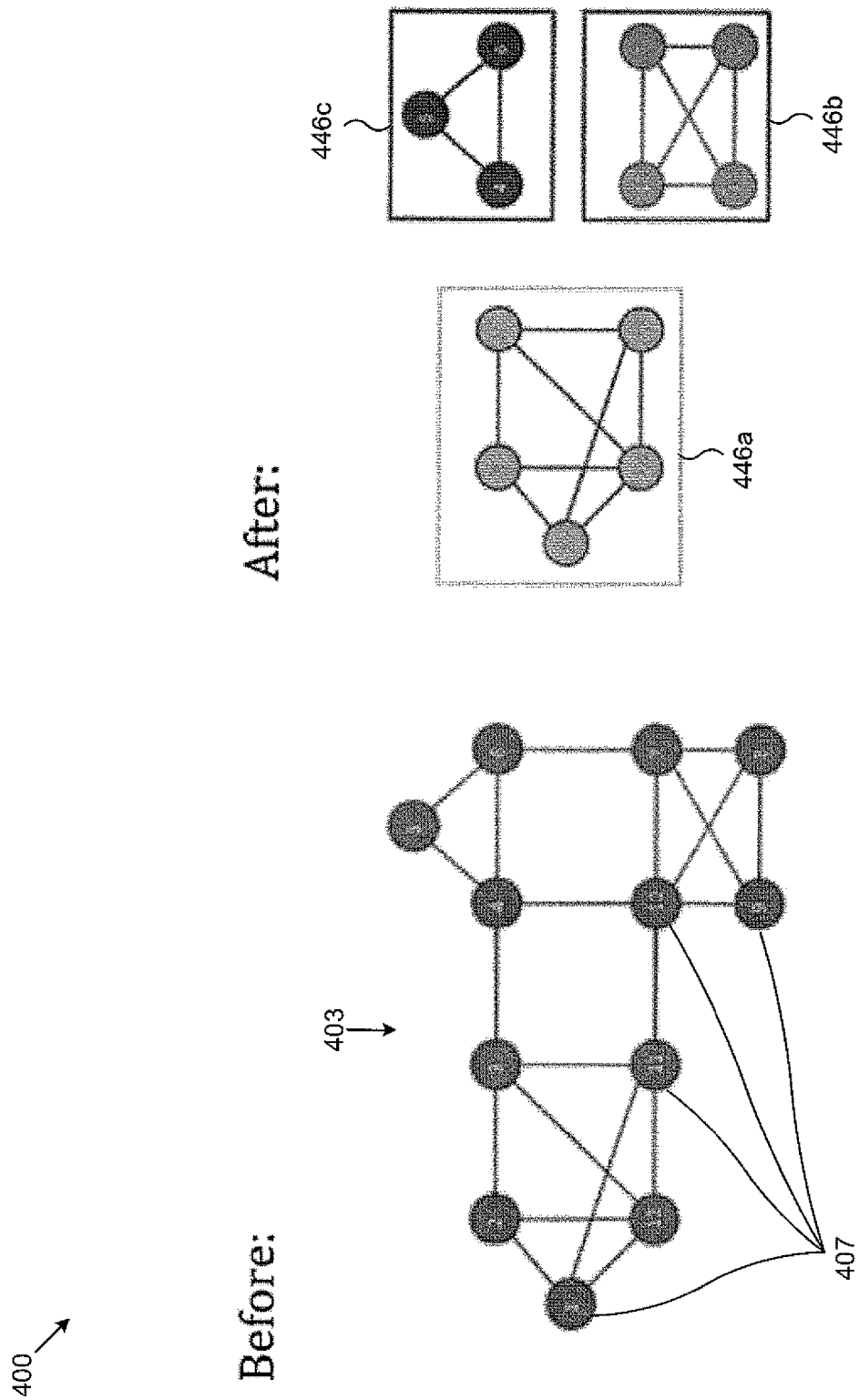
FIG. 4 shows a diagram of an exemplary creation of video subgroups, according to one implementation of the present disclosure.

FIG. 4 shows a diagram of an exemplary creation of video supergroups, according to one implementation of the present disclosure. Diagram 400 illustrates connected video shot groups 407 in video supergroup 403 before grouping module 141 applies the HCS algorithm. As shown, each video shot group 407 is connected to at least one other video shot group 407 by an edge, where each edge may represent a connection between the video shots, such as a temporal relationship. Grouping module 141 may create highly connected subgroups 446a, 446b, and 446c based on the highly connected video shot groups in each subgroup of the initial video supergroup 446a, 446b, and 446c. Each newly created subgroup 446a, 446b, and 446c may be a new video supergroup.

Figure 5:
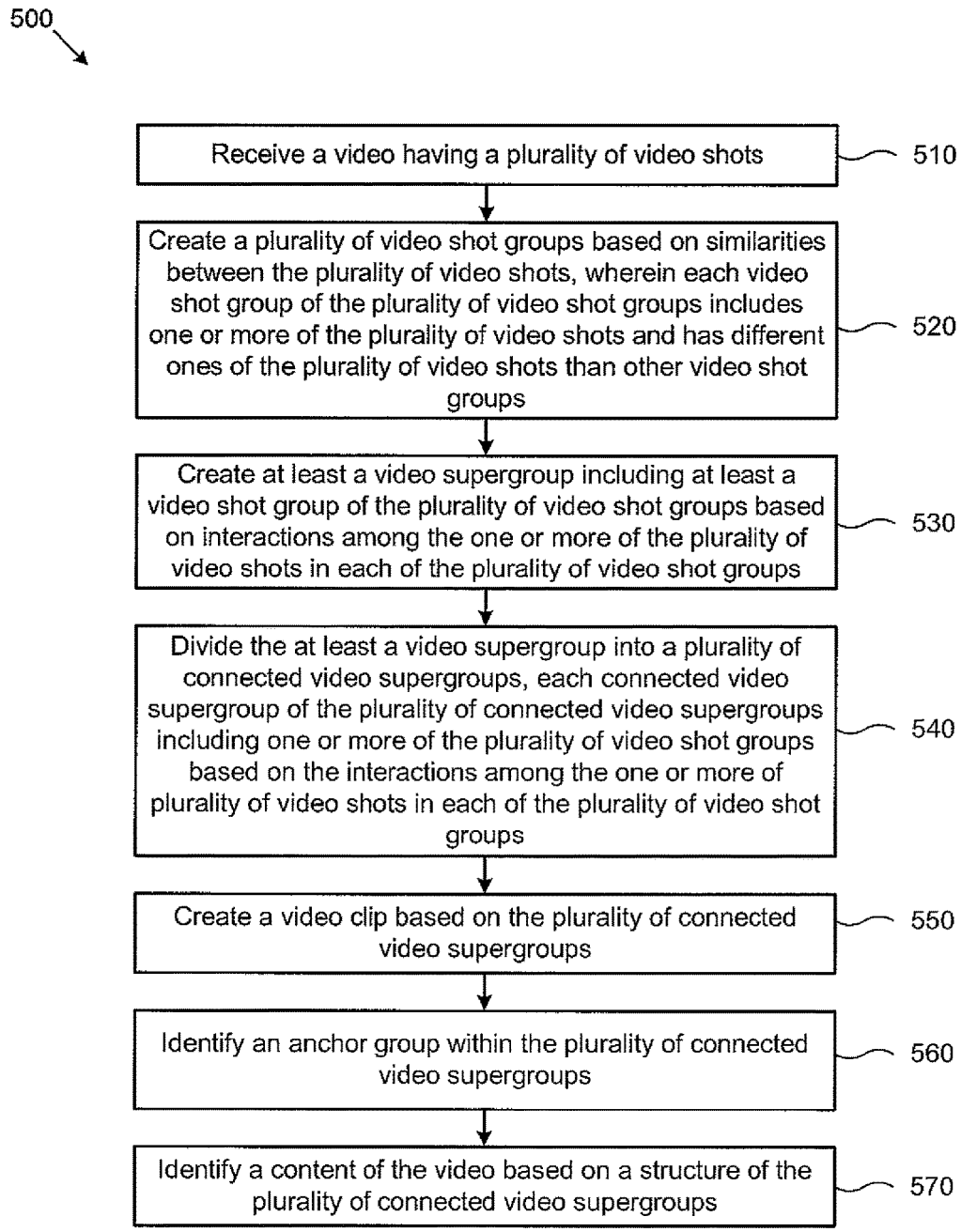
FIG. 5 shows a flowchart illustrating an exemplary method of contextual video shot aggregation, according to one implementation of the present disclosure.

FIG. 5 shows a flowchart illustrating an exemplary method of contextual video shot aggregation, according to one implementation of the present disclosure. Flowchart 500 begins at 510, where computing device 110 receives video 105 having a plurality of video shots. Video 105 may be a live video broadcast or a video that is recorded for delayed broadcast. In some implementations, video 105 may include a plurality of video frames, and the plurality of video frames may make up a plurality of video shots, each video shot including a video frame or a plurality of video frames. Each frame of the video shot may include the same or substantially similar content, such as a plurality of frames that depict the same persons, and/or locations.

At 520, processor 120, using grouping module 141, creates a plurality of video shot groups based on similarities between the plurality of video shots in video 105, each video shot group of the plurality of video shot groups including one or more of the plurality of video shots and has different video shots than other video shot groups. Similarities between the plurality of video shots in video 105 may be based on the content of the plurality of frames in each video shot. A first video shot of video 105 may be similar to a second video shot of video 105 if the first and second video shots include the same person or people, the same place, scene, the same setting, the same location, similar low level features, etc. In some implementations, similarity between shots may be determined based on comparing determined features of sample frames selected from individual video shots of the video groups and/or other techniques for determining video shot similarity.

At 530, processor 120, using grouping module 141, identifies interactions among the one or more of the plurality of video shots in each of the plurality of video shot groups. Interactions among video shots may include the plurality of video shots depicting the same characters and/or locations, or interactions may include the plurality of shots having a temporal and/or sequential relation to one another. In some implementations, grouping module 141 may consider the minimum number of video shots necessary to form a video group and the maximum reachable distance between the video shots in a video group, where distance may be a synthetic distance that depends on low level features such as color distance, geometric similarity or other based in high level components such as facial similarities. The minimum number of video shots in a video shot group may be one, or may be greater than one. The maximum reachable distance may be tailored for any video, such as by automatically tailoring the grouping parameters of the video shot grouping of video 105. In some implementations, the maximum reachable distance between shots may be found by starting with the more relaxed value, and iteratively decreasing the maximum reachable distance until only a few temporally consecutive video shots are grouped together. In some implementations, the few temporally consecutive video shots grouped together may constitute a small percentage of the total number of video shots in video 105.

At 540, processor 120, using grouping module 141, creates a plurality of video supergroups of one or more of the plurality of video shot groups based on the interactions among the one or more of plurality of video shots in each of the plurality of video shot groups. A video supergroup may include video shots from two or more video shot groups that look different but are highly related. For example, in an interview, one video shot group could contain the face of person A and another video shot group could contain the face of person B. The video supergroup could contain both shot groups due to the interactions between the video shot groups.

At 550, processor 120, using video clip module 143, creates video clips based on the plurality of video supergroups. Video clip module 143 may determine that a video supergroup is a video clip if the video supergroup includes only a plurality of video shots that are temporally adjacent to one another in video 105. A video clip may include one video shot or a plurality of video shots. Once a video clip has been identified, video clip module 143 may provide a start time and a corresponding beginning timestamp of the video clip and an end time and a corresponding ending timestamp of the video clip. In some implementations, processor 120 may create video clips independently from, and/or in parallel with, identifying anchor groups in video 105.

At 560, processor 120, using video structure identification module 145, identifies an anchor group including a plurality of video shots of video 105 based on similarities between the plurality of video shots of video 105. A particular type of structure is anchoring, which is when a video is structured around a video supergroup that appears repeatedly across the video (for example the anchorman in the news). In order to detect which one of the video supergroups is the anchor of the show, structure identification module 145 may consider two parameters: (i) the amount of time a video supergroup is on screen, i.e. the aggregate time of the video shots in the video group, and (ii) the range of the possible anchor group, i.e., the amount of time between the first appearance of a video shot in the possible anchor group and the last appearance of a video shot in the possible anchor group. Combining these two parameters may allow structure identification module 145 to discard credit screen shots that may only appear at the beginning of a show and at the end of a show, as well as video shots with unique but long occurrences. An anchor group may be a portion of video 105 that includes a same person or persons in a same setting, such as news anchors of a nightly news program or the judges of a TV talent competition. In some implementations, processor 120 may create video clips independently from, and/or in parallel with, identifying anchor groups in video 105.

At 570, processor 120, using video content identification module 147, identifies a content of video 105 based on the plurality of video supergroups and their properties. For example, content identification module 147 may identify a TV news program based on the video supergroups including anchor sections and a plurality of video supergroups including news content. Similarly, content identification module 147 may identify a TV talent competition based on video supergroups including anchor sections of the judges and a plurality of video supergroups including the contestants. Content identification module 147 may identify a TV sitcom content based on a plurality of video supergroups including various characters from the show in the various locations of the show. Content identification module 147 may similarly identify other types of shows based on video supergroups of video shots and low level features of the video supergroups, such as the temporal length of the video supergroups, the number of video shot groups that conform with the different video supergroups and the sequencing of video supergroups.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a memory storing an executable code; and
   a hardware processor executing the executable code to:
   receive a video having a plurality of video shots;
   create a plurality of video shot groups based on feature distances between the plurality of video shots, wherein each video shot group of the plurality of video shot groups includes one or more of the plurality of video shots and has different ones of the plurality of video shots than other video shot groups;
   create at least one video supergroup including at least one video shot group of the plurality of video shot groups by using a cluster algorithm on the plurality of video shot groups;
   divide the at least one video supergroup into a plurality of connected video supergroups, each connected video supergroup of the plurality of connected video supergroups including one or more of the plurality of video shot groups based on interactions among the one or more of plurality of video shots in each of the plurality of video shot groups;
   identify one of the plurality of connected video supergroups as an anchor video subgroup based on (a) a screen time of the one of the plurality of connected video supergroups, and (b) an amount of time between a first appearance and a last appearance of the video shots of the one of the plurality of connected video supergroups, wherein the anchor video subgroup includes video shots that are not temporally adjacent; and
   assign a category to the video based on the anchor video subgroup of the plurality of connected video supergroups.

2. The system of claim 1, wherein the hardware processor further executes the executable code to:
   provide a start time and an end time for each video shot group of the plurality of video shot groups.

3. The system of claim 1, wherein the hardware processor further executes the executable code to:
   provide a start time and an end time for at least one of the video supergroup and each connected video supergroup of the plurality of connected video supergroups.

4. The system of claim 1, wherein the hardware processor further executes the executable code to:
   create a video clip based on the plurality of connected video supergroups.

5. The system of claim 4, wherein the hardware processor further executes the executable code to:
   provide a beginning timestamp and an ending timestamp for the video clip.

6. The system of claim 1, wherein the hardware processor further executes the executable code to:
   use temporal relationships between the video shots to create a graph with the at least one video supergroup as nodes and the temporal transitions as edges to provide a pair of nodes having an edge therebetween when one node includes one of the video shots adjacent in time with another one of the video shots from another node.

7. The system of claim 1, wherein the hardware processor further executes the executable code to:
   determine the plurality of connected video supergroups based on searching the graph for a number of edges between the video shot groups.

8. The system of claim 1, wherein the category assigned to the video comprises one of a news video, a television (TV) show, and a TV contest.

9. The system of claim 1, wherein interactions among the one or more of the plurality of video shots in each of the plurality of video shot groups includes identifying temporally adjacent video shots in the plurality of video shot groups.

10. The system of claim 1, wherein the feature distances between the plurality of video shots are based on at least one of showing a same person, showing a same place, and a same low level feature including at least one of a similar color and a similar low level geometry descriptor.

11. The system of claim 1, wherein creating the plurality of video shots includes automatically tailoring a grouping parameter to the video.

12. The system of claim 1, wherein the processor further executes the executable code to:
   create a graph of the video, the graph including a plurality of nodes formed by the plurality of supergroups and a plurality of weighted edges connecting the plurality of nodes.

13. A method for use by a system having a memory and a hardware processor, the method comprising:
   receiving, using the hardware processor, a video having a plurality of video shots;
   creating, using the hardware processor, a plurality of video shot groups based on feature distances between the plurality of video shots, wherein each video shot group of the plurality of video shot groups includes one or more of the plurality of video shots and has different ones of the plurality of video shots than other video shot groups;
   creating, using the hardware processor, at least one video supergroup including at least one video shot group of the plurality of video shot groups by using a cluster algorithm on the plurality of video shot groups;
   dividing, using the hardware processor, the at least one video supergroup into a plurality of connected video supergroups, each connected video supergroup of the plurality of connected video supergroups including one or more of the plurality of video shot groups based on interactions among the one or more of plurality of video shots in each of the plurality of video shot groups;
   identifying, using the hardware processor, one of the plurality of connected video supergroups as an anchor video subgroup based on (a) a screen time of the one of the plurality of connected video supergroups, and (b) an amount of time between a first appearance and a last appearance of the video shots of the one of the plurality of connected video supergroups, wherein the anchor video subgroup includes video shots that are not temporally adjacent; and
   assigning, using the hardware processor, a category to the video based on the anchor video subgroup of the plurality of connected video supergroups.

14. The method of claim 13, further comprising:
providing, using the hardware processor, a start time and an end time for each video shot group of the plurality of video shot groups.

15. The method of claim 13, further comprising:
providing, using the hardware processor, a start time and an end time for at least one of the video supergroup and each connected video supergroup of the plurality of connected video supergroups.

16. The method of claim 13, further comprising:
creating, using the hardware processor, a video clip based on the plurality of connected video supergroups.

17. The method of claim 16, further comprising:
providing, using the hardware processor, a beginning timestamp and an ending timestamp for the video clip.

18. The method of claim 13, further comprising:
using temporal relationships between the video shots to create a graph with the at least one video supergroup as nodes and the temporal transitions as edges to provide a pair of nodes having an edge therebetween when one node includes one of the video shots adjacent in time with another one of the video shots from another node.

19. The method of claim 13, further comprising:
determining the plurality of connected video supergroups based on searching the graph for a number of edges between the video shot groups.

20. The method of claim 13, wherein the category assigned to the video comprises one of a news video, a television (TV) show, and a TV contest.

21. The method of claim 13, wherein interactions among the one or more of the plurality of video shots in each of the plurality of video shot groups includes identifying temporally adjacent video shots in the plurality of video shot groups.

22. The method of claim 13, wherein the feature distances between the plurality of video shots are based on at least one of showing a same person, showing a same place and a same low level feature including at least one of a similar color and a similar low level geometry descriptor.

23. The method of claim 13, wherein creating the plurality of video shots includes automatically tailoring a grouping parameter to the video.

24. The method of claim 13, further comprising:
creating, using the hardware processor, a graph of the video, the graph including a plurality of nodes formed by the plurality of supergroups and a plurality of weighted edges connecting the plurality of nodes.

* * * * *